(12) United States Patent
Liu et al.

(10) Patent No.: US 11,611,289 B2
(45) Date of Patent: Mar. 21, 2023

(54) HYBRID MODULAR MULTILEVEL CONVERTER TOPOLOGIES USING HALF-BRIDGE SUBMODULES

(71) Applicant: VIRGINIA TECH INTELLECTUAL PROPERTIES, INC., Blacksburg, VA (US)

(72) Inventors: Jian Liu, Blacksburg, VA (US); Dong Dong, Blacksburg, VA (US); Rolando Burgos, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 9 days.

(21) Appl. No.: 17/378,941

(22) Filed: Jul. 19, 2021

(65) Prior Publication Data

US 2023/0026670 A1   Jan. 26, 2023

(51) Int. Cl.
*H02M 7/483* (2007.01)
*H02M 1/00* (2006.01)

(52) U.S. Cl.
CPC ....... *H02M 7/4837* (2021.05); *H02M 1/0095* (2021.05); *H02M 7/4835* (2021.05)

(58) Field of Classification Search
CPC .......................................... H02M 7/483–4837
See application file for complete search history.

(56) References Cited

U.S. PATENT DOCUMENTS

| 2008/0205093 | A1* | 8/2008 | Davies | H02M 7/4835 363/35 |
| 2021/0044216 | A1* | 2/2021 | Riar | H02M 1/12 |

FOREIGN PATENT DOCUMENTS

WO    WO-2013135277 A1 *  9/2013  ............ H02M 7/487

* cited by examiner

*Primary Examiner* — Peter M Novak
(74) *Attorney, Agent, or Firm* — Thomas Horstemeyer, LLP (57) ABSTRACT

Aspects are described for hybrid modular multilevel converters that include half-bridge submodules. In some embodiments, a hybrid modular multilevel converter can include a direct current (DC) bus and an alternating current (AC) node. A first arm of the hybrid modular multilevel converter includes a first submodule chain link and a first arm inductor and a second arm includes a second submodule chain link and a second arm inductor. A capacitor connects between a first side of the first arm and a first side of the second arm.

20 Claims, 9 Drawing Sheets

HYBRID MODULAR MULTILEVEL CONVERTER TOPOLOGIES USING HALF-BRIDGE SUBMODULES

GOVERNMENT RIGHTS STATEMENT

This invention was made with government support under Grant No. ECCS2022397, awarded by the National Science Foundation. The government has certain rights in this invention.

BACKGROUND

Modular multilevel converter topologies are popular for use in many medium and high voltage applications. Modular multilevel converter topologies can be modular, scalable, and reliable in these applications. However, modular multilevel converter topologies can suffer from several constraints. For example, the number of semiconductor devices per converter system can be high. Modular multilevel converter designs can also require direct current (DC)-link capacitors, which increase the construction cost and overall system volume.

In order to solve this issue, various new topologies have been proposed to improve MMC power density. Some of these topologies feature the combination of high voltage series IGBTs and chain-link structures used in modular multilevel converters and can be referred to as hybrid modular multilevel converters. Some examples can include alternate arm converters, H-bridge hybrid modular converters, parallel hybrid converters, hybrid three-level converters with alternating current (AC)-side cascaded full-bridge submodules, and modular embedded multilevel converters. All the aforementioned topologies can address one or more problems in modular multilevel converters. However, there is still a need for more variable and more efficient solutions for modular multilevel converters.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

The present disclosure relates to flying capacitor type and five level type hybrid modular multilevel converters and rectifiers. Modular multilevel converter topologies are popular for use in many medium and high voltage applications. However, modular multilevel converter topologies can suffer from several constraints. For example, the number of semiconductor devices per converter system can be high. Modular multilevel converter designs can also require direct current (DC)-link capacitors, which increase the construction cost and overall system volume. Although there are a number of variants of modular multilevel converters, there is still a need for more variable and more efficient solutions for modular multilevel converters.

The present disclosure introduces the mechanisms, working principles, and control methods of flying capacitor type and five level type hybrid modular multilevel converters and rectifiers. Compared with traditional technologies, the device number and capacitor size can be reduced significantly. Therefore, smaller volume and construction cost can be achieved.

Figure 1A:
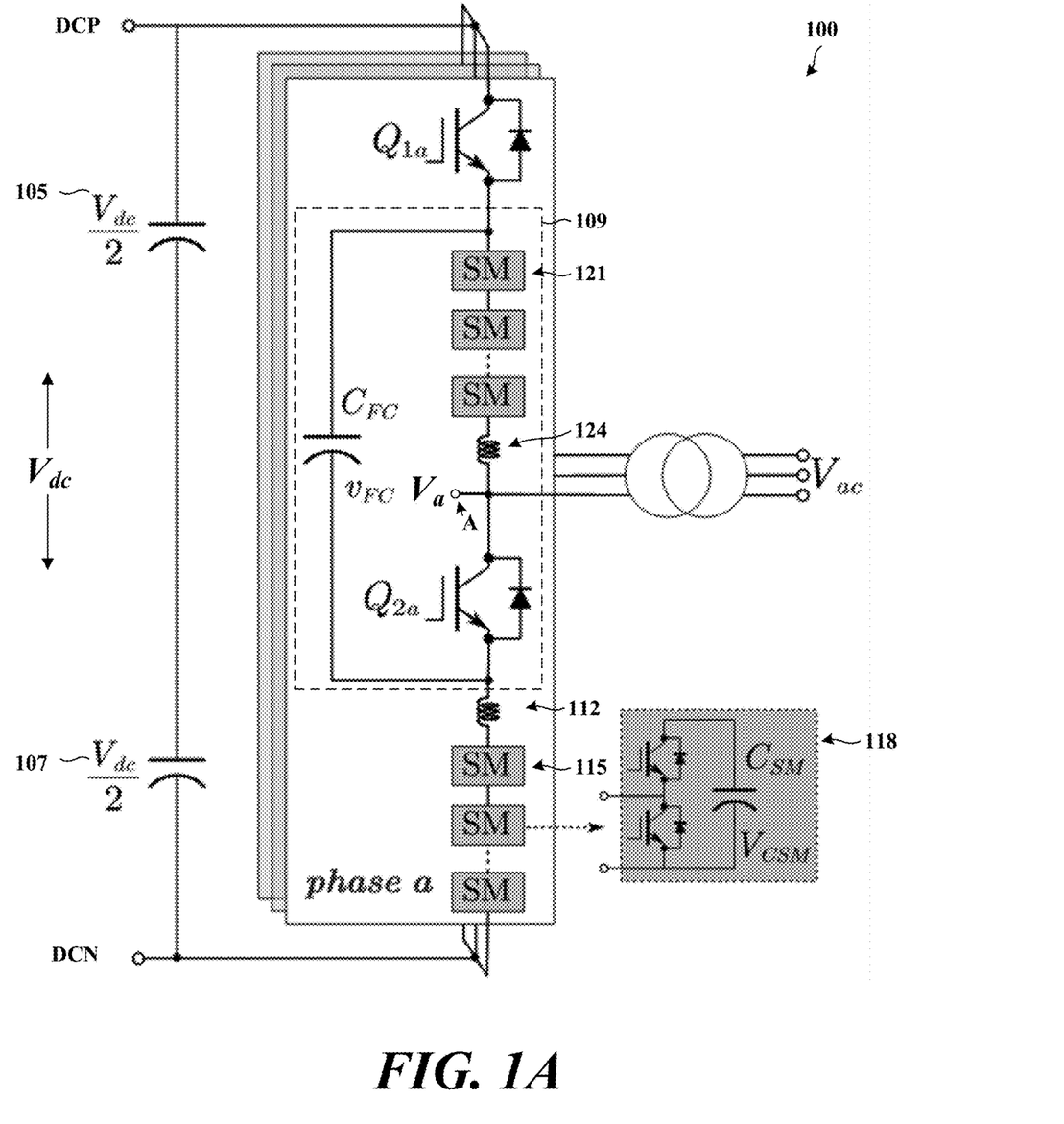
FIG. 1A illustrates an example of a hybrid modular multilevel converter using half-bridge submodules with floating capacitor, according to embodiments of the present disclosure.

FIG. 1A shows a hybrid modular multilevel converter 100, according to embodiments of the present disclosure. The hybrid modular multilevel converter 100 can have a flying capacitor type hybrid modular multilevel converter topology that uses half-bridge submodules. For example, the hybrid modular multilevel converter 100 can include an AC-side node A, and DC-side nodes DCP and DCN. The hybrid modular multilevel converter 100 can be capable of AC-to-DC and DC-to-AC conversions in the various embodiments.

The hybrid modular multilevel converter 100 can include a number of branches for multiphase or polyphase operation, such as three branches for three phase operation as shown. However, any number of phases, such as one phase, two phase, three phase, four phase, five phase, and so on can be used. For the purposes of this discussion, phase "a" can be discussed. However, the concepts discussed with respect to phase a are also applicable to the other phases for multiphase operation.

The hybrid modular multilevel converter 100 can take an input voltage $V_{dc}$ across the input nodes 103. In some cases, there can be two or more series-connected capacitors 105 and 107 in series between the input nodes 103. The capacitor 105 can be described as an "upper DC side" or "p-side" capacitor. The capacitor 107 can be described as a "lower DC side" or "n-side" capacitor. The DC voltage across each of the capacitors 106 can be $V_{dc}/2$. In some examples, the two series capacitors 105 and 107 can have similar or the same capacitance and physical construction.

The hybrid modular multilevel converter 100 can include a switch $Q_{1a}$ in series with a parallel circuit section 109, an "n-side" or "n-arm" arm inductor 112, and an "n-side" or "n-arm" submodule chain link or chain link 115. A voltage $V_{CSM}$ can be a voltage across the submodule capacitor $C_{SM}$. While three are shown, there can be any number of half-bridge submodules 118 in the submodule chain link 115. Each half-bridge submodules can include a DC capacitor submodule capacitor $C_{SM}$.

Generally, each half-bridge submodule 118 can have a voltage rating such that a submodule chain link, such as the submodule chain link 115 and the submodule chain link 121, is capable of handling voltage up to a sum of the capacities of the half-bridge submodules 118 of the submodule chain link 115. For example, if each half-bridge submodule 118 is capable of handling 1 kV, a three submodule set or series can handle 3 kV, and a series of ten half-bridge submodules 118 can handle 10 kV. This enables the hybrid modular multilevel converter 100 to be easily expandable to a desired voltage rating based on application. The half-bridge submodules 118 can include IGBTs, in some examples.

Each half-bridge submodule 118 can include a half-bridge circuit that connects across a submodule capacitor $C_{SM}$. The half-bridge submodule 118 can refer to a submodule that uses a half-bridge connection for each submodule capacitor $C_{SM}$. The submodule capacitors $C_{SM}$ can be the bulkiest circuit component and there can be many half-bridge submodules 118 per chain link. As a result, the capacitor size used for the submodule capacitors $C_{SM}$ can be a primary factor for the cost, investment, and circuit footprint of the hybrid modular multilevel converter 100 as a whole.

Figure 4:
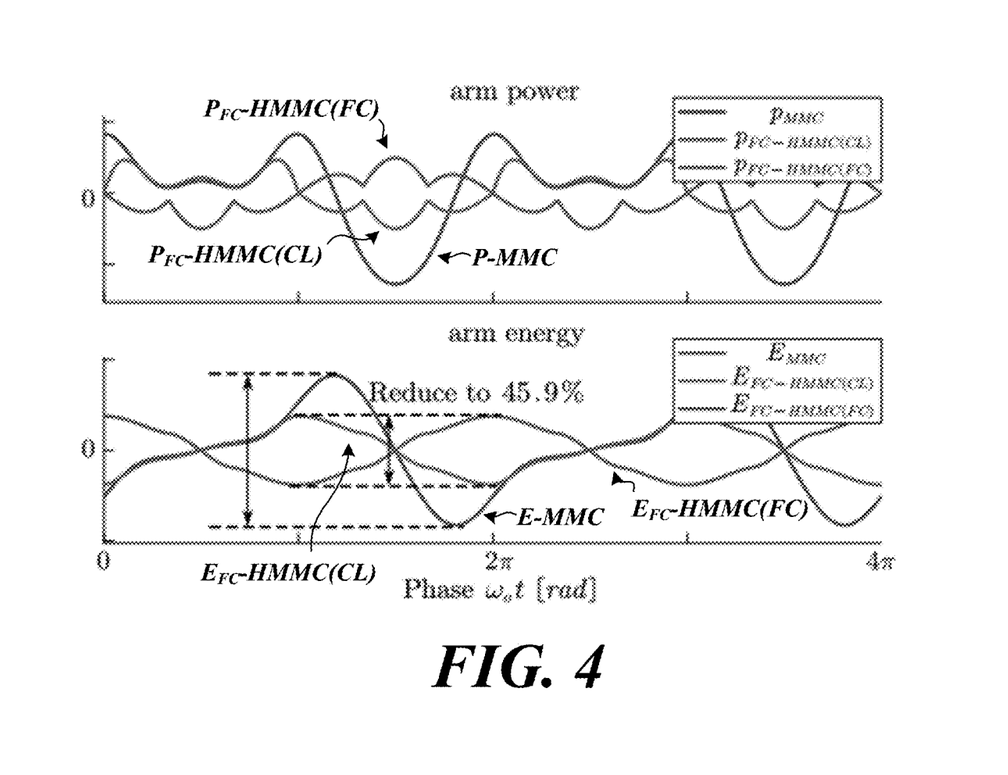
FIG. 4 illustrates an example energy comparison that includes arm power and arm energy of the hybrid modular multilevel converter of FIG. 1A, according to embodiments of the present disclosure.

The capacitance is limited by the voltage ripple, which is determined by the energy variation. The chain-link and flying capacitor instantaneous energy can be calculated by integrating voltage and current, and the comparison between a modular multilevel converter of the same power rating is shown in FIG. 4. The third-order common mode voltage can be injected to AC voltage to realize the highest modulation index. The amplitude of energy deviation can be reduced to 45.9% from a typical modular multilevel converter implementation to the hybrid modular multilevel converter 100, and the total capacitance can be reduced by 31.2%.

The parallel circuit section 109 can include a flying capacitor $C_{FC}$ in parallel with a "p-side" or "p-arm" submodule chain link 121, a "p-side" or "p-arm" arm inductor 124, and a switch $Q_{2a}$. An alternating current (AC) voltage $V_{dc}$ can be output at an output node between the arm inductor 124, and the switch $Q_{2a}$. There can be any number of half-bridge submodules 118 in the submodule chain link 121.

The flying capacitor $C_{FC}$ can include a capacitor that "flies" or connects between two connection states based on the operational positions of the switches $Q_{1a}$ and $Q_{2a}$. For example, in a P state where $Q_{1a}$ is closed and $Q_{2a}$ is opened, the flying capacitor $C_{FC}$ can connect between a positive side terminal of the $V_{dc}$ and the n-arm components. In an N state where $Q_{1a}$ is open and $Q_{2a}$ is closed, the flying capacitor $C_{FC}$ can connect across the p-arm components from a positive side of the submodule chain link 121 to the output voltage $V_a$. P state and N state operation is described further with respect to FIG. 1B.

The flying capacitor $C_{FC}$ can include a large capacitor that is half of the DC bus voltage $V_{dc}$ and is connected across the midpoint of top and bottom branches or arms. In other words, the capacitance of $C_{FC}$ is selected to provide half of the DC bus voltage $V_{dc}$. The switches $Q_{1a}$ and $Q_{2a}$ can include transistor switches that are based on insulated-gate bipolar transistors (IGBT) switches, bipolar junction transistor (BJT) switches, metal oxide semiconductor field effect transistor (MOSFET) switches, and other kinds of switches.

Generally, the switches $Q_{1a}$ and $Q_{2a}$ can include high voltage devices for fundamental switching, and can be rated based on the DC bus input voltage $V_{dc}$ and/or the ac output voltage $V_{ac}$. While the switches $Q_{1a}$ and $Q_{2a}$ can be high voltage devices or series connected high voltage devices, the IGBTs or other transistor components for the half-bridge submodules 118 can be relatively low voltage devices in comparison to switches $Q_{1a}$ and $Q_{2a}$. This can enable the half-bridge submodules 118 to have comparatively high speed chopping.

Figure 1B:
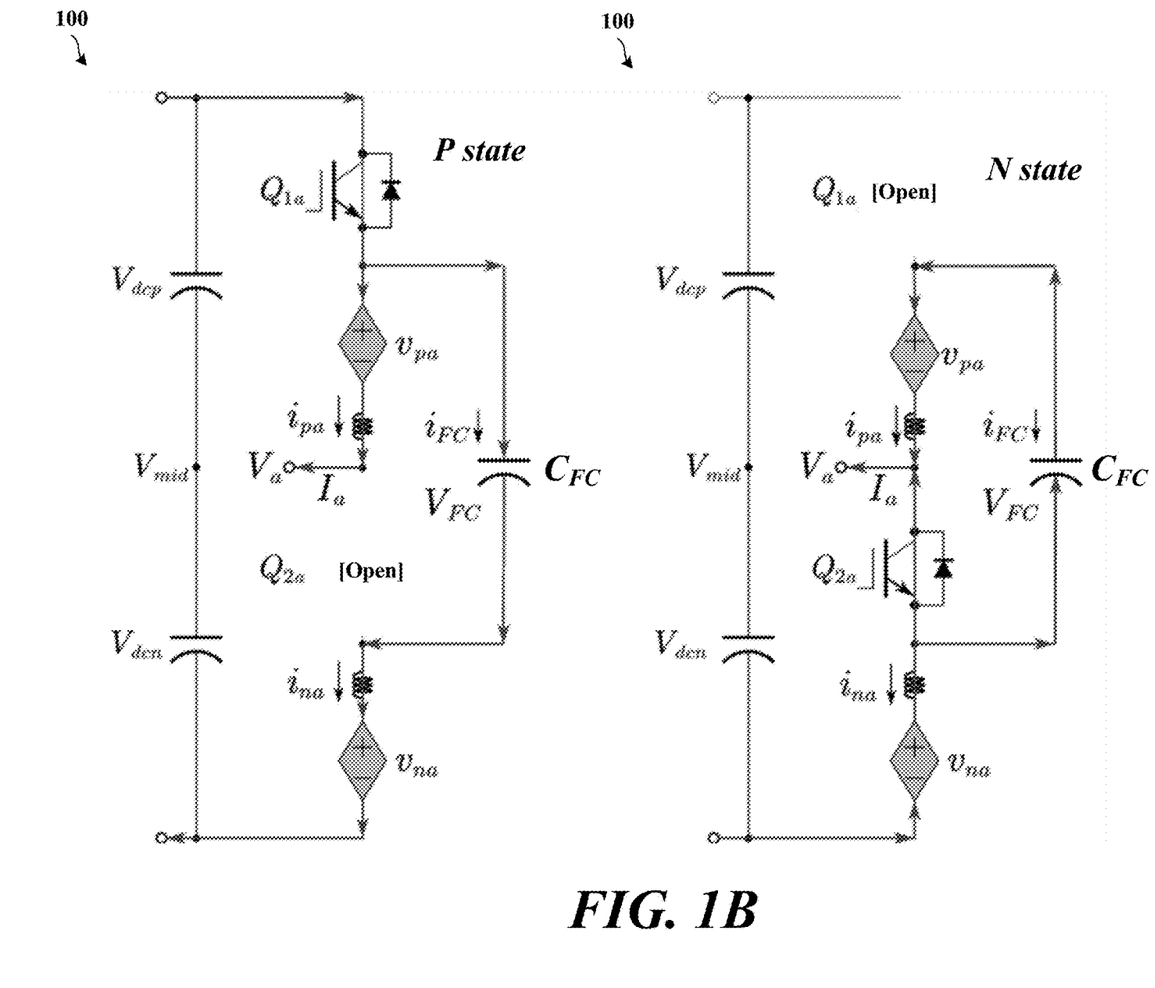
FIG. 1B illustrates an example of operational states of the hybrid modular multilevel converter of FIG. 1A, according to embodiments of the present disclosure.

FIG. 1B shows operational states of the hybrid modular multilevel converter 100. The operational states are labeled P state and N state, respectively. Each of the two states can refer to phase a of the hybrid modular multilevel converter 100 of FIG. 1A.

The chain-link IGBT sequences corresponding to the submodule chain link 121 and the submodule chain link 115 can be configured and set according to the polarity of AC side voltage $V_a$. This can reduce voltage stress on the submodule chain link 121 and the submodule chain link 115. A controller device can control $Q_{1a}$, $Q_{2a}$, the submodule chain link 121, and the submodule chain link 115 according to $V_a$. The controller device can sense $V_a$ using a sensing device and control $Q_{1a}$, $Q_{2a}$, the submodule chain link 121, and the submodule chain link 115 based on this and other inputs. This can include a regulation of the voltage $V_a$, since the switching can affect $V_a$ as well.

In P state, where $V_a>0$, $Q_{1a}$ is turned on or closed, and $Q_{2a}$ is turned off or open. In this state, the upper arm is only paralleled with the flying capacitor, which exchanges energy by controlling current $i_{pa}$. N state corresponds to the situation where $V_a<0$, $Q_{2a}$ is turned on or closed, and $Q_{1a}$ is turned off or open.

The voltage across the submodule chain link 121 can be referred to as $v_{pa}$. The voltage across the submodule chain link 121 can be referred to as $v_{na}$. As a result of the circuit arrangement changes caused by switching $Q_{1a}$ and $Q_{2a}$, these voltages are calculated indifferent ways based on operational state.

In P state, voltage across the submodule chain link 121, $v_{pa}$, can be calculated according to equation (1).

$$v^*_{pa} = V_{dcp} - V_a - V_{mid} \quad (1)$$

where $V_{dcp}$ is the voltage across the upper DC side capacitor 105. $V_a$ is the AC side voltage, and $V_{mid}$ is the voltage at a point between the capacitor 105 and the lower DC side capacitor 107.

In P state, voltage across the submodule chain link 115, $v_{na}$, can be calculated according to equation (2).

$$v^*_{na} = V_{dc} - V_{FC} = 0.5 V_{dc} \quad (2)$$

where $V_{FC}$ is the voltage across the flying capacitor $C_{FC}$, and $V_{dc}$ is the DC bus voltage, across both capacitors 105 and 107.

In N state, voltage across the submodule chain link 121, $v_{pa}$, can be calculated according to equation (3).

$$v^*_{pa} = V_{FC} = 0.5 V_{dc} \quad (3)$$

In N state, voltage across the submodule chain link 115, $v_{na}$, can be calculated according to equation (4).

$$v^*_{na} = V_{dcn} + V_{mid} + V_a \quad (4)$$

where $V_{dcn}$ is the voltage across the upper DC side capacitor 105.

If the midpoint voltage $V_{mid}$ is controlled at zero, then $V_{dcp} = V_{dcn} = 0.5V_{dc}$. The capacitor voltage $V_{FC}$ can be designed to be $0.5V_{dc}$. This can include selection based on circuit parameters including the DC side capacitors 105 and 107, the DC bus voltage, and other circuit components, as well as other control solutions.

According to equation (1), the maximum chain-link voltage across the submodule chain link 121 in P state becomes half of $V_{dc}$ instead of the full DC bus voltage in typical modular multilevel converters. As a result, the number of submodules is reduced by half for the same DC bus voltage. The high voltage series IGBTs of the half-bridge submodules 118 of the submodule chain link 121 can be selected to withstand $0.5V_{dc}$, which means the total number of capacitors and transistor devices can be reduced by 25% in comparison to a traditional modular multilevel converter. Compared to traditional MMC, three-phase flying capacitor type hybrid modular multilevel converter has variable structures during one line-cycle. Applying the principle of phase a to multiple phases, for example, three phases can yield the overall working modes of one line-cycle.

Figure 2:
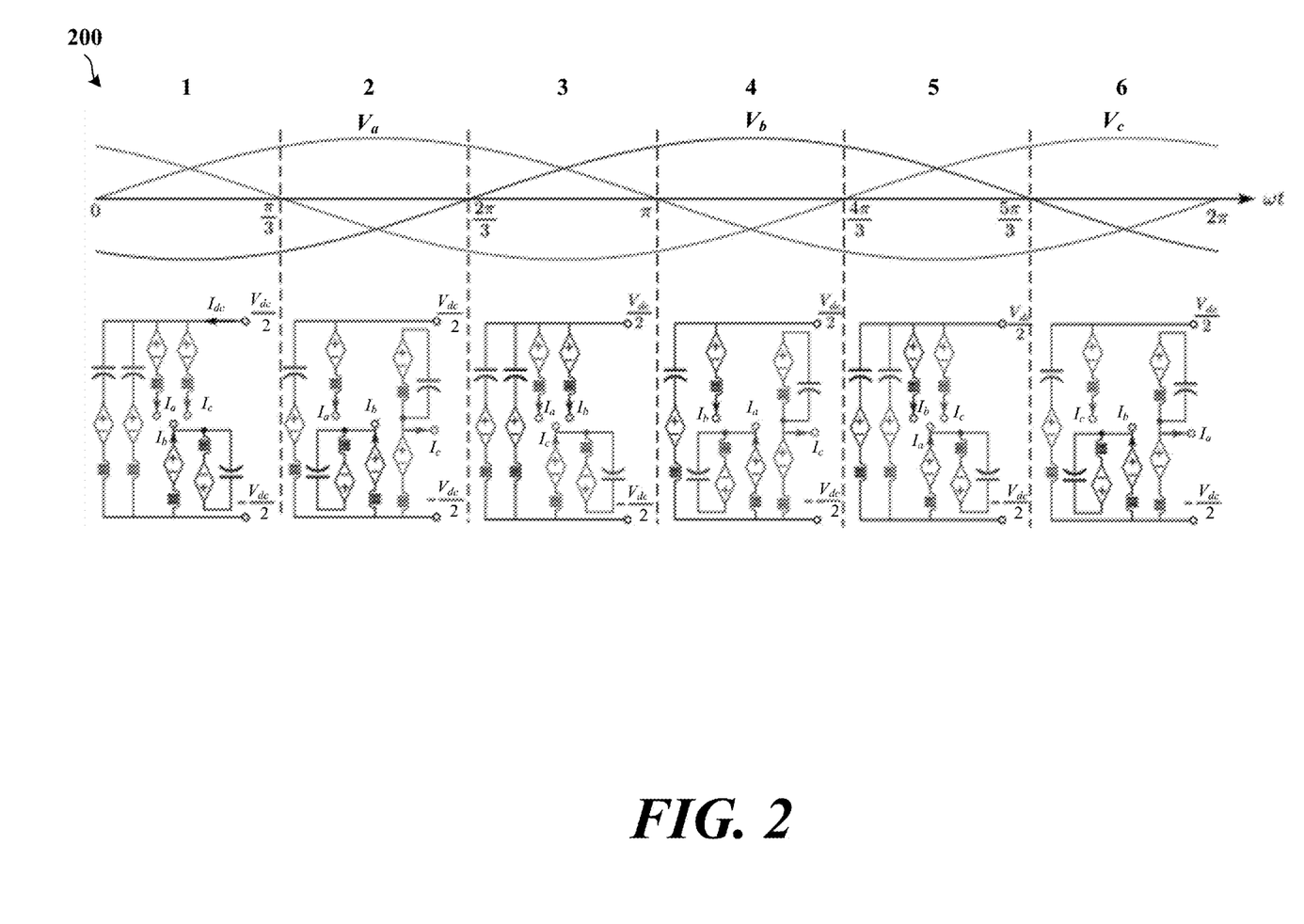
FIG. 2 illustrates an example line cycle of the hybrid modular multilevel converter of FIG. 1A, according to embodiments of the present disclosure.

FIG. 2 shows an example line cycle graph 200 of the flying capacitor type hybrid modular multilevel converter 100. The line cycle graph 200 shows $V_a$ corresponding to phase a, $V_b$ corresponding to phase b, and $V_c$ corresponding to phase c. The voltages $V_a$, $V_b$, and $V_c$ can correspond to AC voltages for these phases of a three-phase flying capacitor type hybrid modular multilevel converter 100. The line cycle graph 200 divides the line cycle into six segments labeled 1 through 6. The six segments can be defined and stored in at least one memory accessible to one or more controllers, which can reference this information for switching control purposes.

The figure also includes a circuit diagram that shows an equivalent circuit that shows the form of each phase a, b, and c for each segment of the line cycle. The circuit portion corresponding to phase a can be identified based on the current $I_a$ generated by the phase a circuit. The circuit portion corresponding to phase b can be identified based on the current $I_b$ generated by the phase b circuit. The circuit portion corresponding to phase c can be identified based on the current $I_c$ generated by the phase b circuit.

Since the total DC bus current can be $I_{dc}$, then the arm currents can be determined. Arm current $i_{pa}$ can be the a-phase current through the p-side arm circuit components including the submodule chain link 121 and the arm inductor 124. Arm current $i_{na}$ can be the a-phase current through the n-side arm circuit components including the submodule chain link 115 and the arm inductor 112.

Similarly, the arm current $i_{pb}$ can be the b-phase current through the p-side arm circuit components including a submodule chain link and an arm inductor. Arm current $i_{nb}$ can represent the b-phase current through the n-side arm circuit components including a submodule chain link and an arm inductor.

Likewise, the arm current $i_{pc}$ can be the c-phase current through the p-side arm circuit components including a submodule chain link and an arm inductor. The arm current in, can represent the c-phase current through the n-side arm circuit components including a submodule chain link and an arm inductor.

For example, when $\omega t \in [0, \pi)$, phase a arm currents $i_{pa}$ and $i_{na}$ can satisfy equations (5)-(7):

$$i_{pa} = I_a, i_{na} + i_{nc} = (I_{dc}/2 - I_a) + (I_{dc}/2 - I_c), \omega t \in [0, \pi/3) \quad (5)$$

$$i_{pa} = I_a, i_{na} = I_{dc} - I_a, \omega t \in [\pi/3, 2\pi/3) \quad (6)$$

$$i_{pa} = I_a, i_{na} + i_{nb} = (I_{dc}/2 - I_a) + (I_{dc}/2 - I_b), \omega t \in [2\pi/3, \pi) \quad (7)$$

The other arm currents for other phases can be identified in a similar manner as described in equations (5)-(7).

In order to eliminate or minimize DC bus current ripple, a trapezoidal current allocation scheme can be adopted to shape $i_{na}$ during a first half cycle. Considering energy balancing, the lower arm current can be designed similarly.

Figure 3:
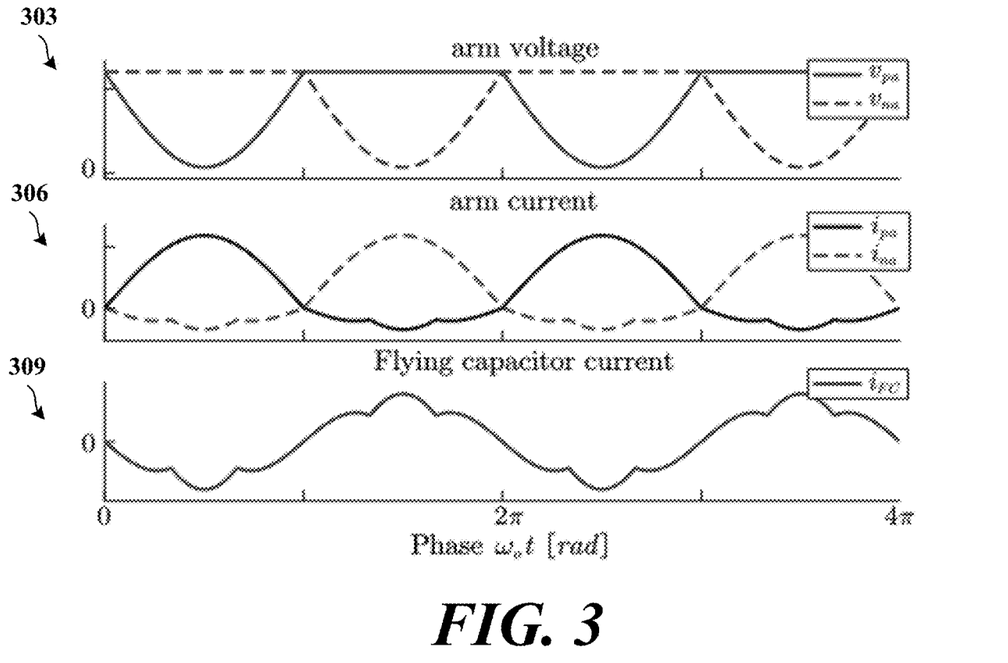
FIG. 3 illustrates an example of arm voltage and current waveforms of the hybrid modular multilevel converter of FIG. 1A, according to embodiments of the present disclosure.

FIG. 3 shows example graphs 303, 306, and 309. The graphs can include arm voltages, arm currents, and flying capacitor current for the hybrid modular multilevel converter 100.

Graph 303 shows example waveforms for single phase arm voltages $v_{pa}$ and $v_{na}$ for the hybrid modular multilevel converter 100, neglecting the mid-point voltage. The solid line can represent an example of single phase arm voltage $v_{pa}$, for example, for phase a. The dotted line can represent an example of single phase arm voltage $v_{na}$, for example, for phase a. Other phases can be similar as can be understood.

Graph 306 shows example waveforms for single phase arm currents $i_{pa}$ and $i_{na}$ for the hybrid modular multilevel converter 100, neglecting the mid-point voltage. The solid line can represent an example of single phase arm current $i_{pa}$, for example, for phase a. The dotted line can represent an example of single phase arm voltage $i_{na}$, for example, for phase a. Other phases can be similar as can be understood.

Graph 309 shows an example waveform for single phase flying capacitor current $i_{FC}$ for the hybrid modular multilevel converter 100.

FIG. 4 shows a power comparison graph 403 and an energy comparison graph 406. The power comparison graph 403 includes a waveform for power of a typical modular multilevel converter, as well as waveforms for flying capacitor power and power for a chain-link or submodule chain link 115 or 121 for an arm of the hybrid modular multilevel converter 100.

The energy comparison graph 406 includes a waveform for power of a typical modular multilevel converter, as well as waveforms for flying capacitor energy and energy for a chain-link or submodule chain link 115 or 121 for an arm of the hybrid modular multilevel converter 100.

As indicated above, the submodule capacitors $C_{SM}$ can be the bulkiest circuit component and there can be many half-bridge submodules 118 per chain link. As a result, the capacitor size used for the submodule capacitors $C_{SM}$ can be a primary factor for the cost, investment, and circuit footprint of the hybrid modular multilevel converter 100 as a whole. The capacitance can be limited by the voltage ripple, which can be identified by the energy variation.

The chain-link and flying capacitor instantaneous energy for the hybrid modular multilevel converter 100 can be calculated by integrating voltage and current. Third-order common mode voltage can be injected to AC voltage to realize the highest modulation index. In one example, the amplitude of energy deviation can be reduced by 45.9% by the hybrid modular multilevel converter 100, as compared to a typical modular multilevel converter. In this example, total capacitance of the hybrid modular multilevel converter 100 can be reduced by 31.2%, as compared to a typical modular multilevel converter.

Figure 5:
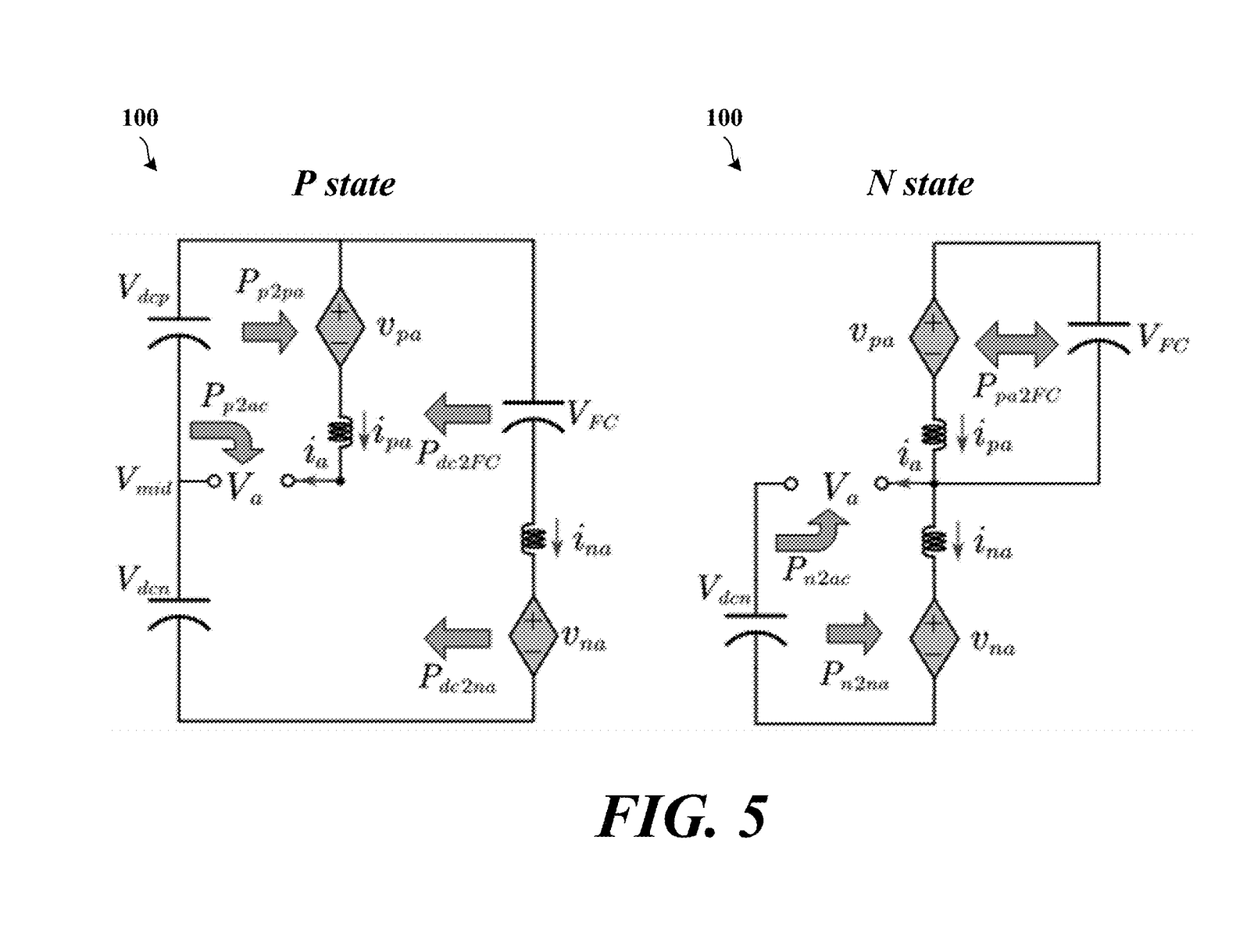
FIG. 5 illustrates an example of power flow in two operational states of the hybrid modular multilevel converter of FIG. 1A, according to embodiments of the present disclosure.

FIG. 5 illustrates an example of power flow in two operational states of the flying capacitor type hybrid modular multilevel converter 100. A controller can determine firing or switching signals for two IGBT stacks of $Q_{1a}$ and $Q_{2a}$ according to the segment location as shown in FIG. 2. The firing or switching signals for components of the submodule chain link 115 and 121 can be relatively difficult. The internal dynamics of each submodule 118 has to be controlled to ensure system stability and dynamic performance. This can be performed by analyzing the power flow.

The possible power flow paths from DC side to AC side can be analyzed to determine the capacitor voltage balancing. This process can follow two different working states, P state and N state. The general power flow of the P state and N state circuits are shown here, and the circuits are shown in greater detail with respect to FIG. 1B.

First considering P state, the power transferred from the upper DC side capacitor 105 through the upper arm, namely through the submodule chain link 121, is named as $P_{p2pa}$. Since $i_{na}$ is negative, power can be transferred from flying capacitor $C_{FC}$ and the lower arm to the whole DC bus at the same time. Power between the flying capacitor $C_{FC}$ and the DC bus can be referred to as the $P_{dc2FC}$, as shown in the figure. In the N state, power can exchange between upper arm submodule chain link 121 and flying capacitor as $P_{pa2FC}$. Power between the lower DC capacitor to lower arm submodule chain link 115 can be $P_{ndna}$.

Figure 6:
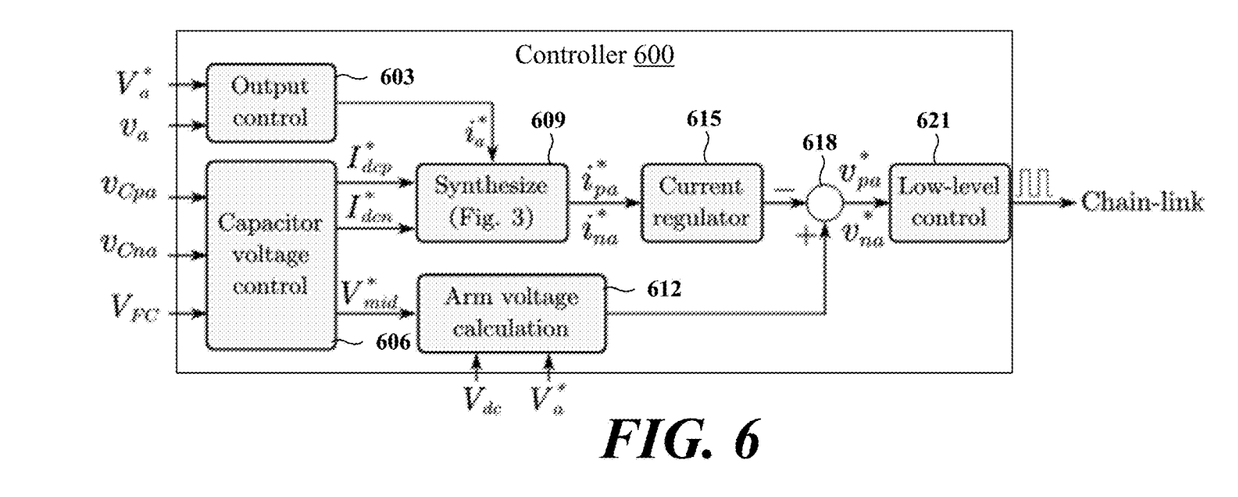
FIG. 6 illustrates an example of a control block diagram for the hybrid modular multilevel converter of FIG. 1A, according to embodiments of the present disclosure.

FIG. 6 shows an example of a control block diagram for a controller 600 and the flying capacitor type hybrid modular multilevel converter 100. The control block diagram can include a number of control blocks or components including an output control component 603, a capacitor voltage control component 606, a current synthesis control component 609, an arm voltage calculation component 612, a controller component 615, a difference component 618, and a low-level submodule control component 621.

The control can be generally based on the power flow outlined in FIG. 5, and the currents and voltages generated can conform to FIGS. 3 and 4. The control block diagram can receive the input values from circuit sensors that provide a parameter corresponding to the indicated circuit measurement, or the voltage or current can be identified by providing it to a component of the controller 600. The various control blocks can be performed by a single controller or using multiple controllers of the flying capacitor type hybrid modular multilevel converter 100.

The overall control block diagram for the hybrid modular multilevel converter 100 can be obtained based on the power flow of FIG. 5. For example, the submodule chain link 115 and the submodule chain link 121 as well as the flying capacitor $C_{FC}$ can each take a number of parameters for control at a rated value. The parameters can include the DC current value for the powers $P_{dc2FC}$ ($P_{dc2na}$), $P_{pa2FC}$ and the mid-point voltage $V_{mid}$.

The two arm current references could be synthesized according to FIG. 3, and the feed-forward arm voltage can be calculated using $V_{dc}$, $V_a$ and $V_{mid}$. Once the voltage reference is obtained, the submodule voltage balancing and multilevel-level modulation is included in the low-level arm control. The capacitor voltage can be controlled to conform to a waveform according to FIG. 4.

Table I and Table II can provide a summary of electrical parameters used for discussion of the controller 600 and other aspects of the disclosure.

TABLE I

Electrical parameters

| Parameters | Symbol | Example Value |
|---|---|---|
| Rated power | P | 432 kW |
| Dc bus voltage | $V_{dc}$ | 10 kV |
| Ac voltage amplitude | $V_{ac}$ | 4.8 kV |
| Number of SM per arm | N | 5 |
| SM capacitance | $C_{sm}$ | 1.3 mF |
| SM voltage | $V_{sm}$ | 1.1 kV |
| SM switching frequency | $f_s$ | 12 kHz |
| Arm inductance | $L_m$ | 3 mH |
| Flying capacitor voltage | $V_{FC}$ | 5 kV |
| Flying capacitance | $C_{FC}$ | 260 µF |

TABLE II

Additional Electrical parameters

| Phase [a, b, c] voltage | $V_a V_b V_c$ |
|---|---|
| Submodule capacitor voltage for [p, n] side and phase [a, b, c] | $v_{Cpa}$, $v_{Cna}$, $v_{Cpb}$, $v_{Cnb}$, $v_{Cpc}$, $v_{Cnc}$ |
| Current through [p, n] side DC side capacitor | $I_{dcp}$, $I_{dcn}$ |
| Current through [p, n] side submodule chain link for phase [a, b, c] | $i_{pa}$, $i_{na}$, $i_{pb}$, $i_{nb}$, $i_{pc}$, $i_{nc}$ |
| Voltage across [p, n] side submodule chain link for phase [a, b, c] | $v_{pa}$, $v_{na}$, $v_{pb}$, $v_{nb}$, $v_{pc}$, $v_{nc}$ |

Generally, lower case lettering can indicate instantaneous values, while upper case lettering can indicate a steady state value or an average value such as a root mean square (RMS) value. While some values are shown in lower case or upper case in the table, the corresponding values can also be used elsewhere. An asterisk can indicate an exact value. Even where exact values are indicated in the disclosure, estimated or approximate values can also be used in the various examples as can be understood.

The output control component 603 can take inputs including $V_a^*$ and $v_a$, to calculate and generate $i_a^*$. The output control component 603 can output $i_a^*$ and provide it as an input to the current synthesis control component 609.

The capacitor voltage control component 606 can take inputs including $v_{Cpa}$, $v_{Cna}$, and $V_{FC}$. The capacitor voltage control component 606 can calculate and generate $I^*_{dcp}$, $I^*_{dcn}$, and $V^*_{mid}$. The capacitor voltage control component 606 can output $I^*_{dcp}$ and $I^*_{dcn}$, and provide them as inputs to the current synthesis control component 609. The capacitor voltage control component 606 can output V*mid and provide this value as an input to the arm voltage calculation component 612.

The current synthesis control component 609 can take inputs including $i_a^*$, $I^*_{dcp}$, and $I^*_{dcn}$. The current synthesis control component 609 can calculate and generate $i_{pa}^*$ and $i_{na}^*$ using the inputs. The current synthesis control component 609 can output $i_{pa}^*$ and $i_{na}^*$, providing them as inputs to the controller component 615.

The arm voltage calculation component 612 can take inputs including $V^*_{mid}$, $V_{dc}$, and $V_a^*$. The arm voltage calculation component 612 can calculate and generate $v_{pa}^*$ and $v_{na}^*$. The arm voltage calculation component 612 can output $v_{pa}^*$ and $v_{na}^*$, providing them as inputs to the difference component 618.

The controller component 615 can take inputs including $i_{pa}^*$ and $i_{na}^*$. The controller component 615 can regulate these currents, and can provide them, or corresponding parameter values, to the difference component 618. The difference component 618 can take inputs including $v_{pa}^*$, $v_{na}^*$, $i_{pa}^*$, and $i_{na}^*$. The difference component can difference any two of these values, providing the result to the low-level submodule control component 621.

The low-level submodule control component 621 can take inputs including differences between $v_{pa}^*$, $v_{na}^*$, $i_{pa}^*$, and $i_{na}^*$, as well as differences between current values and previous values for each of these parameters in order to generate control signals that control the transistors or others switches to regulate the flying capacitor type hybrid modular multilevel converter 100 such that the currents and voltages generated conform to FIGS. 3 and 4, or according to another set of constraints and desired values.

Figure 7:
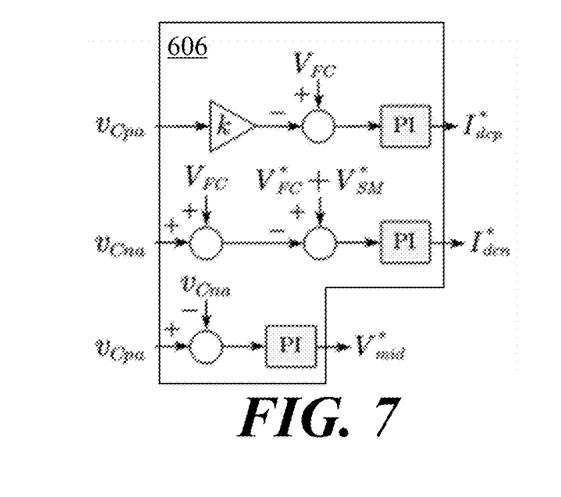
FIG. 7 illustrates an example of capacitor voltage control for the hybrid modular multilevel converter of FIG. 1A, according to embodiments of the present disclosure.

FIG. 7 illustrates an example of the capacitor voltage control component 606 of the controller 600 of the hybrid modular multilevel converter 100. The capacitor voltage control component 606 can take inputs including $v_{Cpa}$, $v_{Cna}$, $V_{FC}$, $V_{FC}^*$, $V_{SM}^*$. Based on values for these and other circuit parameters, the capacitor voltage control component 606 can calculate and generate $V^*_{mid}$, $I^*_{dcp}$ and $I^*_{dcn}$.

In this example, the capacitor voltage control component 606 can amplify $v_{Cpa}$ using an amplifier component. The capacitor voltage control component 606 can difference the amplified, or unamplified, $v_{Cpa}$ with $V_{FC}$. The capacitor voltage control component 606 can use the difference between the amplified $v_{Cpa}$ and $V_{FC}$ to generate $I^*_{dcp}$ using a proportional integral controller. The capacitor voltage control component 606 can provide $I^*_{dcp}$ to the current synthesis control component 609.

The capacitor voltage control component 606 can difference the $v_{Cna}$ with $V_{FC}$. The capacitor voltage control component 606 can then difference this output with a sum of $V^*_{FC}$ and $V^*_{SM}$. The capacitor voltage control component 606 can generate $I^*_{dcn}$ using a proportional integral controller and the resulting difference. The capacitor voltage control component 606 can provide $I^*_{dcn}$ to the current synthesis control component 609.

The capacitor voltage control component 606 can difference the $v_{Cna}$ with $v_{Cna}$ and generate $V^*_{mid}$ using a proportional integral controller. The capacitor voltage control component 606 can be communicatively coupled to provide $V^*_{mid}$ to the arm voltage calculation component 612.

Figure 8:
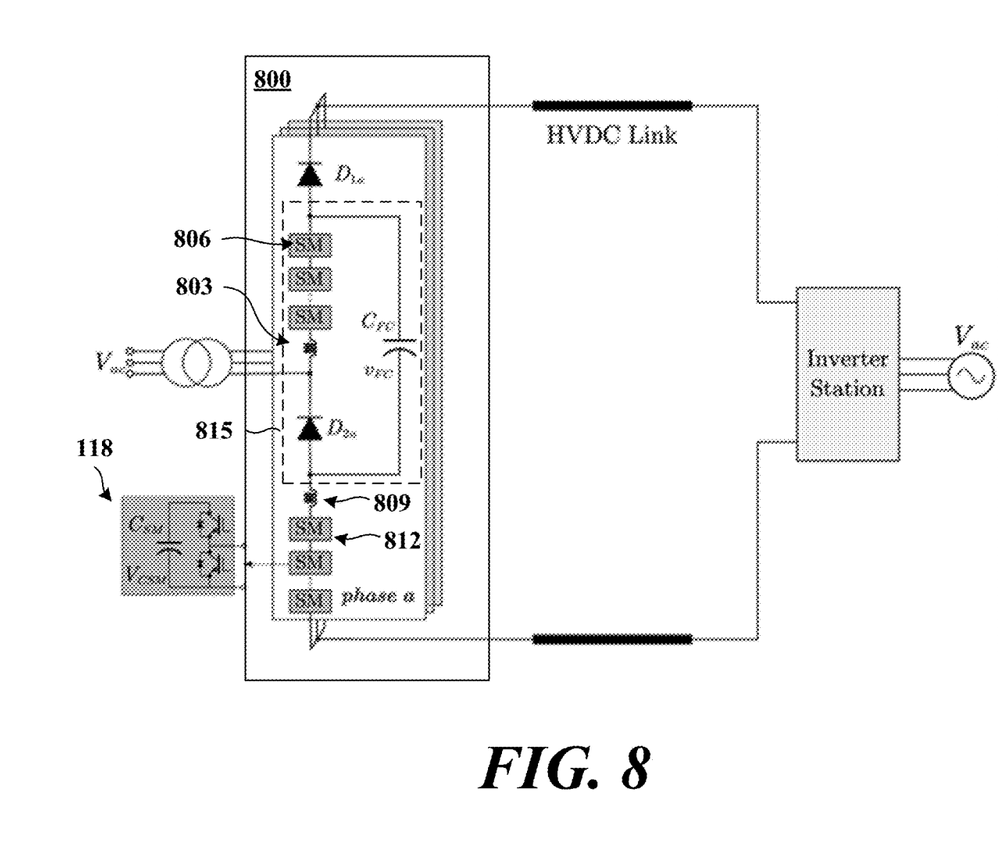
FIG. 8 illustrates an example of a hybrid modular multilevel rectifier using half-bridge submodules, according to embodiments of the present disclosure.

FIG. 8 illustrates an example of a hybrid modular multilevel rectifier 800. The hybrid modular multilevel rectifier 800 can be a flying capacitor type rectifier topology that uses half-bridge submodules 118. The hybrid modular multilevel rectifier 800 can include a number of branches for multiphase or polyphase operation, such as three branches for three phase operation as shown. By contrast with the hybrid modular multilevel converter 100 of FIG. 1A, the hybrid modular multilevel rectifier 800 can take multiple AC voltages of the various different phases of an AC input, and can convert these into a DC voltage.

The hybrid modular multilevel rectifier 800 can provide the DC voltage output, for example, as a high voltage DC link or connection. The high voltage DC link can include a low-loss power transmission line that connects to an inverter station that converts the DC voltage back to polyphase AC voltage. The inverter station can convert the DC voltage into AC voltage, for example, using the hybrid modular multilevel converter 100 of FIG. 1A.

The hybrid modular multilevel rectifier 800 can include any number of phases, such as one phase, two phase, three phase, four phase, five phase, and so on can be used. For the purposes of discussion, phase "a" can be discussed. The concepts discussed are also applicable to the other phases for multiphase operation. In this example describing a phase operation, the hybrid modular multilevel rectifier 800 can take the a-phase AC voltage $V_a$ as an input.

The hybrid modular multilevel rectifier 800 can include two arms, such as a p-arm and an n-arm. The p-arm components can include an arm inductor 803 and a submodule chain link 806. The n-arm components can include an arm inductor 809 and a submodule chain link 812.

The submodule chain link 806 can include any number of half-bridge submodules 118. The number of half-bridge submodules 118 can be selected according to the voltage of the voltage $V_a$ and the DC voltage of the high voltage DC link. The submodule chain link 812 can include any number of half-bridge submodules 118. The number of half-bridge submodules 118 can be selected according to the voltage of the voltage $V_a$ and the DC voltage of the high voltage DC link.

Generally, each half-bridge submodule 118 can have a voltage rating such that a submodule chain link 806 and 812 is capable of handling voltage up to the sum of the half-bridge submodules 118. For example, if each half-bridge submodule 118 is capable of handling 1.1 kV, a three submodule set or series can handle 3.3 kV, and a 5 submodule set can handle 5.5 kV. This enables the hybrid modular multilevel rectifier 800 to be easily expandable to a desired voltage rating based on application.

Each half-bridge submodule 118 can include a half-bridge circuit that connects across a submodule capacitor $C_{SM}$. The submodule capacitors $C_{SM}$ can be the bulkiest circuit component and there can be many half-bridge submodules 118 per IGBT stack. As a result, the capacitor size used for the submodule capacitors $C_{SM}$ can be a primary factor for the cost, investment, and circuit footprint of the hybrid modular multilevel rectifier 800 as a whole.

The hybrid modular multilevel rectifier 800 can include a diode $D_{2a}$ connected in series with a circuit section 815, and the n-arm components. The circuit section 815 can include a flying capacitor $C_{FC}$ connected in parallel with the "p-arm" submodule chain link 806, a "p-side" or "p-arm" arm inductor 803, and a diode $D_{2a}$. The phase a AC voltage input $V_a$ can be connected between the p-arm inductor 803 and the diode $D_{2a}$.

The hybrid modular multilevel rectifier 800 can be achieved using passive diodes rather than actively controlled switches. The hybrid modular multilevel rectifier 800 can include a controller that switches the half-bridge submodules 118 of the submodule chain link 806 and the submodule chain link 812 in order to convert the phase a AC voltage $V_a$ into the DC voltage.

Figure 9A:
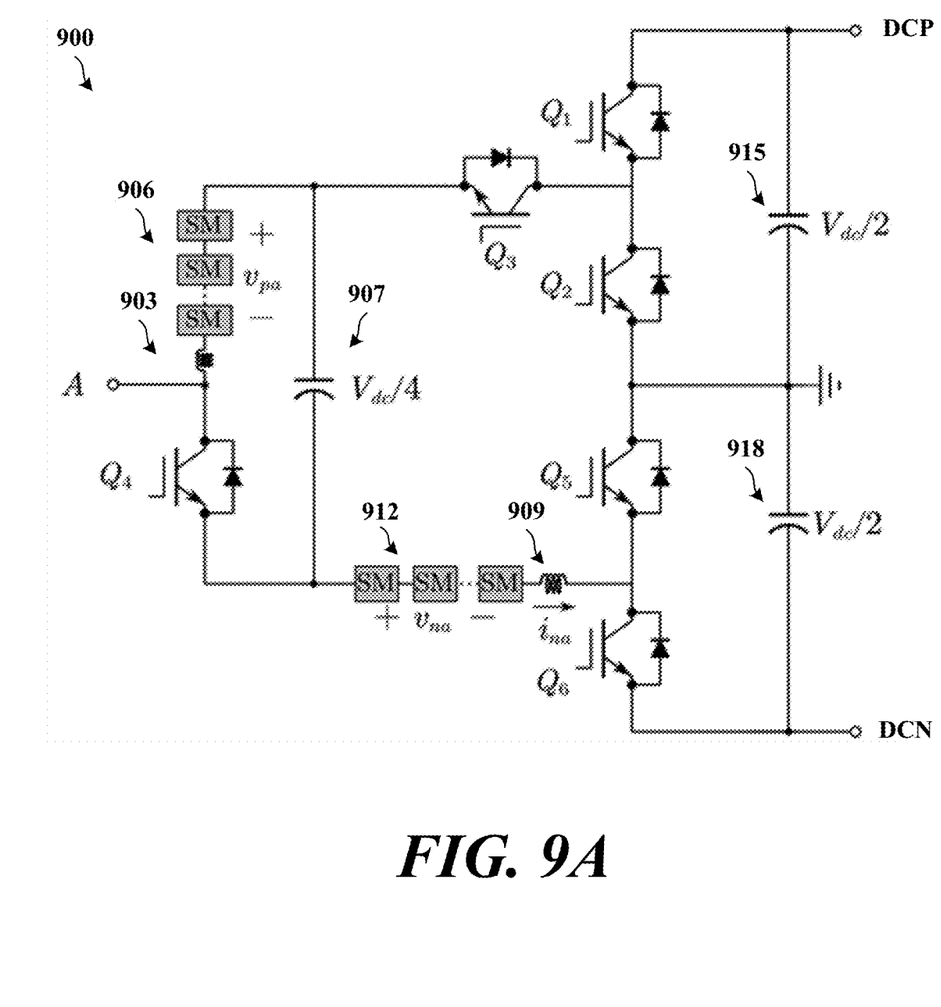
FIG. 9A illustrates an example of another hybrid modular multilevel converter using half-bridge submodules, according to embodiments of the present disclosure.

FIG. 9A illustrates an example of a hybrid modular multilevel converter 900. The hybrid modular multilevel converter 900 can include a five level hybrid modular multilevel converter topology that uses half-bridge submodules 118. The hybrid modular multilevel converter 900 can include an AC-side node A, and DC-side nodes DCP and DCN. The hybrid modular multilevel converter 900 can be capable of AC-to-DC and DC-to-AC conversions between the AC-side node A, and DC-side nodes DCP and DCN in the various embodiments. A controller can control the operation of the switches $Q_1$-$Q_6$, as well as the half-bridge circuit components of the half-bridge submodules 118.

The hybrid modular multilevel converter 900 can include p-arm components including an arm inductor 903 and a submodule chain link 906. The hybrid modular multilevel converter 900 can include n-arm components including an arm inductor 909 and a submodule chain link 912.

The submodule chain link 906 can include any number of half-bridge submodules 118. The AC-side node A can connect to the arm inductor 903 of the p-arm components and one side of a switch $Q_4$. A capacitor 907 can connect from the submodule chain link 906 to another side of the switch $Q_4$. The capacitor 907 can be selected to have one quarter of the DC bus voltage $V_{dc}$.

A node between the capacitor 907 and the submodule chain link 906 can connect to one side of a switch $Q_3$. Another side of the switch $Q_3$ can connect to a first side of a switch $Q_1$ and a first side of a switch $Q_2$. The other side of the switch $Q_1$ can connect to DCP, and the other side of the switch $Q_2$ can connect to ground, or a midpoint between capacitors 915 and 918 that is also connected to $Q_5$. The capacitors 915 and 918 can connect substantially in series between DCP and DCN. The capacitors 915 and 918 can be selected to have half of the DC bus voltage $V_{dc}$.

A node can connect the capacitor 907, the switch $Q_4$, and the n-arm components, for example, to the submodule chain link 912. It can be noted that the position of an arm inductor and a submodule chain link can be switched for arm components of the various converters and rectifiers discussed. Another side of the n-arm components can connect to a switch $Q_5$ and a switch $Q_6$. The other side of the switch $Q_5$ can connect to ground, or a midpoint between capacitors 915 and 918 that is also connected to $Q_5$.

Figure 9B:
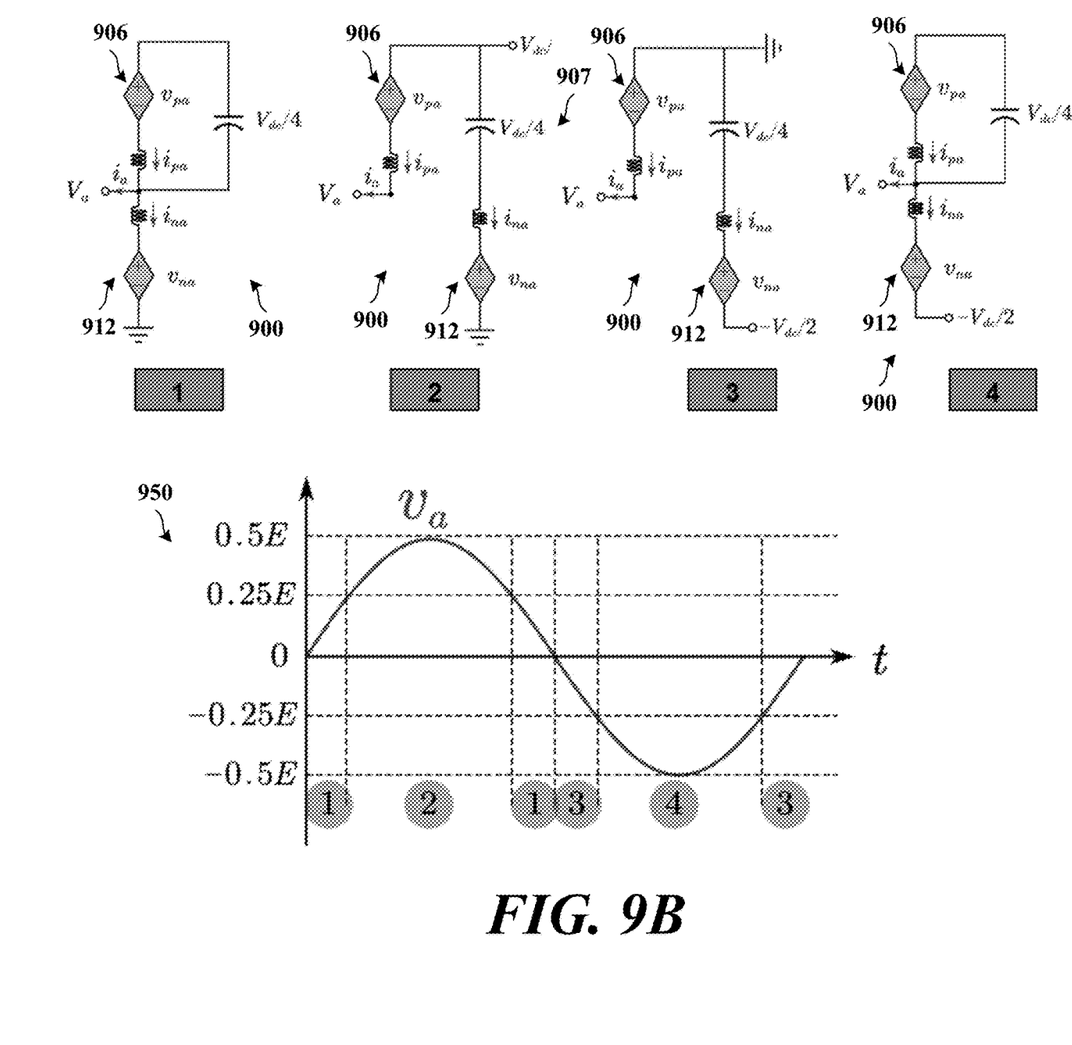
FIG. 9B illustrates an example of the operation of the hybrid modular multilevel converter of FIG. 9A, according to embodiments of the present disclosure.

FIG. 9B illustrates an example of the operation of the hybrid modular multilevel converter 900. For example, the equivalent circuits labeled 1, 2, 3, and 4 can correspond to the four phase a operational states 1, 2, 3, and 4 of the hybrid modular multilevel converter 900.

A controller of the hybrid modular multilevel converter 900 can control switching components of the hybrid modular multilevel converter 900 according to the operational states 1-4 indicated in the graph 950. The graph 950 shows that the operational states 1-4 can correspond to phase a AC voltage $V_a$. The switching components of the hybrid modular multilevel converter 900 can include the switches $Q_1$-$Q_6$, as well as the half-bridge circuit components of the half-bridge submodules 118 of the submodule chain link 906 and the submodule chain link 912.

Although the functionalities, services, programs, and computer instructions described for controllers and other components herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Although flowcharts can show a specific order of execution, it is understood that the order of execution can differ from that which is depicted. For example, the order of execution of two or more blocks can be scrambled relative to the order shown. The flowcharts can be viewed as depicting an example of a method implemented by a computing device. The flowchart can also be viewed as depicting an example of instructions executed in a computing device. Also, two or more blocks shown in succession can be executed concurrently or with partial concurrence. Further, in some embodiments, one or more of the blocks shown can be skipped or omitted. In addition, any number of counters, state variables, semaphores, or warning messages might be added to the logical flow described herein, for purposes of enhanced utility, accounting, performance measurement, or providing troubleshooting aids, etc. It is understood that all such variations are within the scope of the present disclosure.

Also, the functionalities described herein that include software or code instructions can be embodied in any non-transitory computer-readable medium, which can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or functionality described herein can be implemented and structured in a variety of ways. For example, one or more applications described can be implemented as modules or components of a single application or set of instructions. Further, one or more instructions described herein can be executed in shared or separate computing devices or a combination thereof.

The above-described examples of the present disclosure are merely possible examples of implementations set forth for a clear understanding of the principles of the disclosure. While aspects and figures are provided for clarity of discussion, it is understood that the concepts described with respect to a particular figure or context can be utilized and combined with the concepts described with respect to the other figures and contexts. These variations and modifications can be made without departing substantially from the principles of the disclosure. All such modifications and variations are intended to be included herein within the scope of this disclosure and protected by the following claims.

Therefore, at least the following is claimed:

1. A hybrid modular multilevel converter comprising:
a direct current (DC) bus comprising a first DC node and a second DC node, wherein the first DC node comprises a higher voltage than the second DC node;
an alternating current (AC) node;
a first arm comprising a first submodule chain link and a first arm inductor, the first submodule chain link comprising a first plurality of half-bridge submodules, wherein a first switch connects between the first DC node and the first arm;
a second arm comprising a second submodule chain link and a second arm inductor, the second submodule chain link comprising a second plurality of half-bridge submodules, wherein the second arm connects between the second DC node and a second switch that connects to the AC node;
a capacitor that connects in parallel with series-connected components comprising the first arm and the second switch, from a high side node between the first switch and the first arm, and a low side node between the second switch and the second arm, wherein the AC node is between the first arm and the second switch; and
at least one controller device that controls switching components of the hybrid modular multilevel converter to perform an AC-to-DC conversion or a DC-to-AC conversion.

2. The hybrid modular multilevel converter of claim 1, further comprising:
a first DC-side capacitor; and
a second DC-side capacitor, wherein the first DC-side capacitor and the second DC-side capacitor are connected in series from the first DC node to the second DC node.

3. The hybrid modular multilevel converter of claim 1, wherein the first switch is connected between the first DC node and a node that connects to a first side of the capacitor and the first submodule chain link wherein a second side of the first arm connects to the AC node.

4. The hybrid modular multilevel converter of claim 3, wherein the switching components comprise the first switch and the second switch.

5. The hybrid modular multilevel converter of claim 3, wherein a respective one of the first switch and the second switch comprise a voltage rating selected based at least in part on a DC voltage across the DC bus, and wherein the first plurality of half-bridge submodules and the second plurality of half-bridge submodules comprise a plurality of insulated gate bipolar transistors comprising a lower voltage rating and higher chopping speed with respect to a respective one of the first switch and the second switch.

6. The hybrid modular multilevel converter of claim 1, wherein the second switch is connected between the AC node and the second submodule chain link.

7. The hybrid modular multilevel converter of claim 6, wherein the switching components comprise insulated gate bipolar transistors of the first submodule chain link and the second submodule chain link.

8. A hybrid modular multilevel rectifier, comprising:
an alternating current (AC) node;
a direct current (DC) bus comprising a first DC node and a second DC node, wherein the first DC node comprises a higher voltage than the second DC node;
a first arm comprising a first submodule chain link and a first arm inductor, the first submodule chain link comprising a first plurality of half-bridge submodules, wherein a first diode connects between the first DC node and the first arm;
a second arm comprising a second submodule chain link and a second arm inductor, the second submodule chain link comprising a second plurality of half-bridge submodules, wherein the second arm connects between the second DC node and a second diode that connects to the AC node;
a capacitor that connects across the first arm and the second diode, from a high side node between the first diode and the first arm, and a low side node between the second diode and the second arm, wherein the AC node is between the first arm and the second diode.

9. The hybrid modular multilevel rectifier of claim 8, wherein the hybrid modular multilevel rectifier transmits power comprising a DC voltage to an inverter station through a high voltage DC link.

10. The hybrid modular multilevel rectifier of claim 9, wherein the inverter station comprises a hybrid modular multilevel converter.

11. The hybrid modular multilevel rectifier of claim 8, wherein the first plurality of half-bridge submodules and the second plurality of half-bridge submodules comprise a plurality of insulated gate bipolar transistors.

12. The hybrid modular multilevel rectifier of claim 8, wherein the first plurality of half-bridge submodules comprises a plurality of capacitors connected in series using a corresponding plurality of half-bridge circuits.

13. The hybrid modular multilevel rectifier of claim 8, wherein a respective one of the first diode and the second diode comprise a voltage rating selected based at least in part on a DC voltage across the DC bus.

14. The hybrid modular multilevel rectifier of claim 13, wherein the first plurality of half-bridge submodules and the second plurality of half-bridge submodules comprise a plurality of insulated gate bipolar transistors comprising a lower voltage rating and higher chopping speed with respect to the respective one of the first diode and the second diode.

15. A method, comprising:
switching, using at least one controller device, a first switch, a second switch, a first plurality of half-bridge submodules, and a second plurality of half-bridge submodules according to an AC line cycle definition, wherein the first switch is connected to a first DC node of a DC bus, and one of the second plurality of half-bridge submodules is connected to a second DC node of the DC bus, wherein the first DC node comprises a higher voltage than the second DC node; and
performing, using a flying capacitor hybrid modular multilevel converter and the at least one controller device, at least one of an AC-to-DC conversion and a DC-to-AC conversion based at least in part on the switching, wherein the flying capacitor hybrid modular multilevel converter comprises a first arm comprising the first plurality of half-bridge submodules and an arm inductor, and a capacitor connected across the first arm and the second switch, from a high side node between the first switch and the first arm, and a low side node between the second switch and a second arm, wherein an alternating current (AC) node is between the first arm and the second switch.

16. The method of claim 15, wherein the at least one controller device generates switching signals according to the AC line cycle definition and a plurality of inputs comprising an AC node voltage, a DC bus voltage, a flying capacitor voltage, a first voltage across the first plurality of half-bridge submodules, and a second voltage across the second plurality of half-bridge submodules.

17. The method of claim 15, a capacitance of the capacitor is selected to provide half of a DC voltage across the DC bus of the flying capacitor hybrid modular multilevel converter.

18. The method of claim 15, wherein one of the first plurality of half-bridge submodules connects to the AC node of the flying capacitor hybrid modular multilevel converter.

19. The method of claim 18, wherein the at least one controller device comprises a capacitor voltage control component that takes inputs comprising a flying capacitor voltage, and submodule capacitor voltages of the first plurality of half-bridge submodules and the second plurality of half-bridge submodules.

20. The method of claim 18, wherein the at least one controller device comprises a low-level control component that generates control signals for insulated gate bipolar transistors of the first plurality of half-bridge submodules and the second plurality of half-bridge submodules.

* * * * *